INVENTOR.
Clifford W. Allen
BY Ralph W. McIntire, Jr.
Attorney

Dec. 17, 1968    C. W. ALLEN    3,416,381
SOLENOID ACTUATED VALVE WITH MANUAL OVERRIDE
Original Filed Dec. 6, 1963    2 Sheets-Sheet 2

INVENTOR.
Clifford W. Allen
BY Ralph U. McIntire, Jr.
Attorney

United States Patent Office 3,416,381
Patented Dec. 17, 1968

3,416,381
SOLENOID ACTUATED VALVE WITH
MANUAL OVERRIDE
Clifford W. Allen, Lexington, Ky., assignor to Westinghouse Air Brake Company, Wilmerding, Pa., a corporation of Pennsylvania
Original application Dec. 6, 1963, Ser. No. 328,755, now Patent No. 3,332,445, dated July 25, 1967. Divided and this application May 19, 1967, Ser. No. 639,837
7 Claims. (Cl. 74—89.15)

ABSTRACT OF THE DISCLOSURE

An axially movable stem is engageable with a coaxially movable solenoid plunger to effect valve operation manually through movement of the plunger. A rotary movement of the stem releasably locks the valve in operated position.

---

This is a division of application Ser. No. 328,755, filed Dec. 6, 1963, now Patent No. 3,332,445, issued July 25, 1967, by Clifford W. Allen.

It is an object of this invention to provide a manual override device for a solenoid operated valve, which device is of simple construction yet is quickly and easily locked into or released from the override position.

In the present invention this object is achieved by disposing a manually operative stem for axial movement in a bottom bore in an auxiliary housing fixed to a solenoid housing coaxially with the armature or plunger of a solenoid. The stem is disposed for axial movement against a spring bias through an aperture in the bottom bore into the solenoid housing in engagement with the end of the solenoid armature whereupon depression of the stem depresses the solenoid which in turn operates valve means associated therewith. In order to provide for releasably locking the manually operative stem in the depressed position, the upper end of the stem is provided with threads, portions of which threads are omitted or removed to provide a pair of oppositely disposed, axially extending planar portions disposed between the legs of a U-shaped spring wire fixed in the housing transversely of the stem. The legs of the U-shaped member are spaced apart a predetermined distance so as to be slidably received in the grooves of the threads when the stem is axially depressed and rotated about its axis to dispose the planar portions transversely of the legs, thereby locking the stem in the depressed position. When the stem is rotated about its axis to dispose the planar portions in parallel relation with the legs, the threads are disengaged from the legs to provide for free axial movement of the stem.

Figure 1:
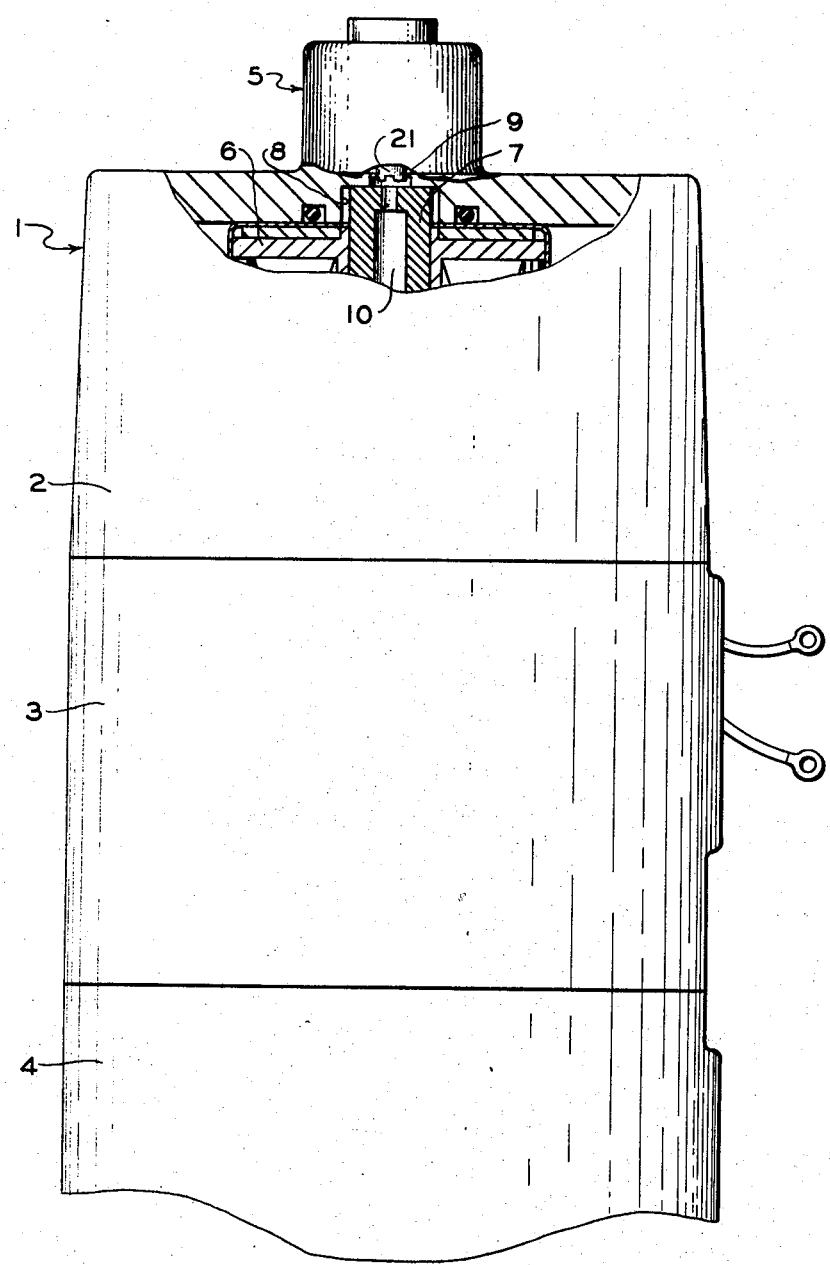
FIG. 1 is a side elevational view, taken partly in section, of a solenoid operated valve device having the manual override device of the present invention disposed on the upper end thereof.

Referring now to the drawing, and particularly to FIG. 1 thereof, there is shown a solenoid operated valve device generally indicated at 1 including a main housing comprised of a plurality of interconnected housing segments 2, 3 and 4 and further including a manual override device generally indicated at 5 disposed atop and integral with segment 2 of the main housing.

The main housing segment 2 includes therein a solenoid 6 having a plunger or armature 7 normally disposed in the upper limit position, as shown, by a spring means, not shown, in which position the end of the plunger engages the bottom of a counterbore 8 of bore 9 in the upper end of segment 2. The plunger 7 includes an axially disposed exhaust passage 10 registering with bore 9 at the upper end and registering at the other end with the exhaust passage in an exhaust valve stem, not shown, carried by the plunger.

The main housing segment 3 includes therein a pilot valve, not shown, operable in response to energization of the solenoid and the resultant downward axial movement of plunger 7, to supply fluid under pressure from a supply passage, not shown, to a delivery passage, not shown. Upon deenergization of the solenoid, the plunger returns to the position shown in FIG. 1, permitting the supply valve to reseat whereupon the delivery passage is simultaneously exhausted via the exhaust stem to exhaust passage 10 in plunger 7, bore 9 and manual override 5 to atmosphere.

The main housing segment 4 includes therein a piston operated spool valve device, not shown, controlled by the pressures in the aforementioned supply and delivery passages.

The above-described undisclosed mechanisms enclosed in main housing segments 2, 3 and 4 are not a part of the present invention since the present invention is applicable to any conventional apparatus performing the above-described functions, and, therefore, the details thereof have been omitted from the specification in the interest of brevity and clarity. However, reference is made to aforementioned copending application Ser. No. 328,755 for purposes of illustrating particular structure which has been utilized for achieving the above functions in cooperation with the present invention.

Figure 2:
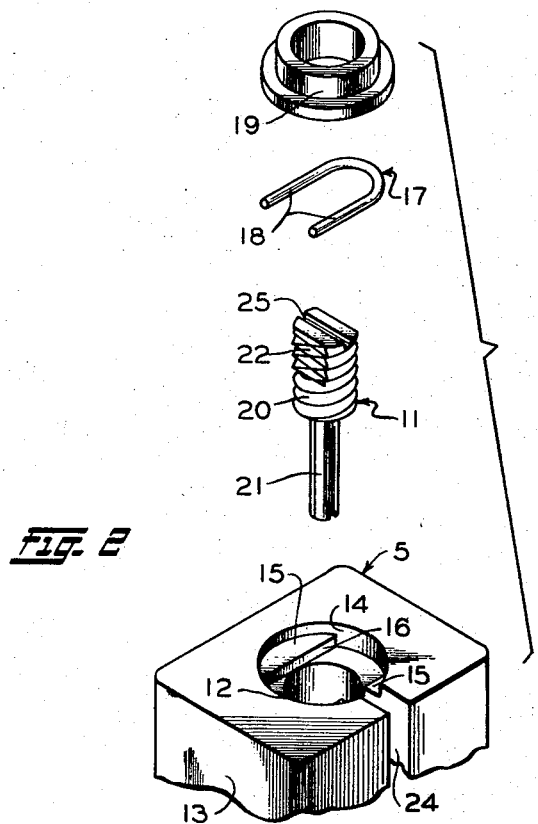
FIG. 2 is an exploded perspective view of the manual override device of FIG. 1.

Referring now to the present invention, as shown in detail in FIGS. 2, 3, 4 and 5 of the drawings, in order to provide manual operation of the plunger 7 to effect an opening operation of the pilot valve, there is provided a manual override device 5 comprising an operator stem 11 disposed in a bore 12 in a housing 13 integral with the solenoid housing segment 2, the bore 12 coaxially communicating with the bore 9 in housing segment 2. A counterbore 14 of larger diameter than bore 12 is provided at the top of bore 12, within which counterbore there are disposed a pair of depressed shoulder or ledge members 15, 15 having their inner linear edges 16, 16 disposed mutually parallel and in substantial tangential relationship with the bore 12, as best seen in FIG. 2. A U-shaped spring wire having a bight portion 17 interconnecting a pair of legs 18, 18 is disposed in a flat position on the bottom of counterbore 14 in perpendicular relation with the bore 12 so that the legs 18, 18 thereof longitudinally abut the edges 16, 16 of the shoulders or ledges 15, 15 such that the mid-portion of each leg 18 overhangs the upper end of bore 12. A collar member 19 is fixed in the counterbore 14 for retaining the spring wire in the position above described. It is to be noted that collar member 19 is omitted from FIG. 4 for convenience of illustration. The operator stem 11 includes a threaded upper portion 20 of greater outside diameter than the distance between the legs 18, 18 of the spring 17, an unthreaded lower portion 21, and a pair of parallel opposing flat or planar portions 22, 22 on the upper threaded portion 20. The stem is disposed for axial movement in the bore 12 whereby the end of the lower portion 21 passes through the bore 9 in the lowermost position of the stem operator 11, as shown in FIG.

Figure 3:
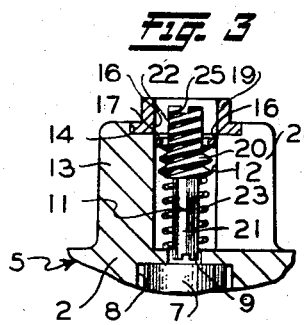
FIG. 3 is a cross-sectional view of the manual override device of FIG. 2, showing the override device in the deactuated position.
Figure 4:
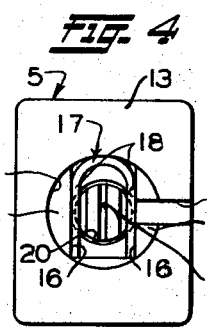
FIG. 4 is a top plan view of the manual operator of FIG. 2 with a portion thereof removed for convenience of illustration.
Figure 5:
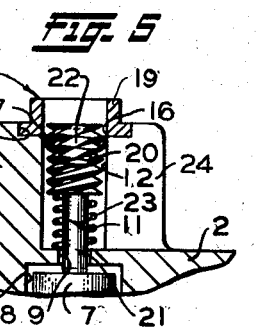
FIG. 5 is a cross-sectional view of the manual operator of FIG. 2, showing the operator in the actuated position.

5, and whereby the upper flat portions 22 extend upwardly between the leg members 18, 18 for all axial positions of the operator stem 11, as shown in FIGS. 3 and 5. A spring 23 is disposed between the bottom of bore 12 and the threaded portion 20 of operator stem 11 to normally bias the operator stem to the upper position, as shown in FIG. 3. A longitudinal slot 24 is provided in the housing 13 in communication with the bores 12 and 9 for providing interconnection of the exhaust passage 10 in plunger 7 with atmosphere.

In normal operation of the above-described manual override device, when the flat portions 22, 22 of operator stem 11 are disposed parallel with the legs 18, 18 of the wire 17, as shown in FIG. 3, operator stem is urged upwardly by the spring 23 to hold the lower end of the operator stem out of engagement with the plunger 7. Depressing the operator stem to the position shown in FIG. 5 will correspondingly depress solenoid plunger 7 to operate the above-described pilot valve. Depressing the operator stem 11 and turning it ¼ turn in either direction will engage the threads with the legs 18 of the U-shaped spring wire, thus locking the stem in the downward position as shown in FIG. 5. The override device 5 may then be deactuated by rotating operator stem 11 in either direction ¼ turn as by means of a screw driver inserted in slot 25 on the upper end of operator stem 11. Spring 23 then returns operator stem 11 to the upper position, as shown in FIG. 3, permitting the solenoid plunger 7 to return to its normal upper position to effect closing of the hereinbefore described pilot valve.

Having now described the invention, what I claim as new and desire to secure by Letters Patent is:

1. A valve operator device, comprising:
   (a) a body having a bore therein,
   (b) an operator stem disposed for axial and rotatable movement in said bore and having a threaded portion thereon,
   (c) said threaded portion having a pair of parallel opposed axially extending planar portions spaced apart a distance less than the maximum diameter of said threaded portion, and
   (d) laterally spaced thread engaging means fixed transversely in said bore, said means spaced apart a predetermined distance to engage said threaded portion when said stem is rotated about its axis to dispose said planar portions perpendicular to said means, said pre-determined distance being greater than said distance between said planar portions to provide free axial movement of said stem when said stem is rotated about its axis to dispose said planar portions parallel to said means.

2. The valve operator as recited in claim 1, in which said thread engaging means comprises a pair of spaced linear members disposed on the bottom of a counterbore of said bore in substantial tangential relationship with said bore, with an intermediate portion of each of said members partially overlying said bore.

3. The valve operator as recited in claim 2 in which said linear members comprise the legs of a U-shaped member having the bight portion thereof disposed entirely within said counterbore, and shoulder means are provided in said counterbore laterally engaging said legs.

4. The valve operator as recited in claim 1, in which said bore comprises a bottom bore and said body includes an aperture extending therethrough coaxially with said bottom bore, said stem having one end disposed for reciprocal movement through said aperture for operating a valve mechanism.

5. The valve operator as recited in claim 4, in which a return spring is disposed in said bottom bore between said threaded portion of said stem and the bottom of said bottom bore to bias the stem to a limit position within the bore.

6. A valve operator device, comprising:
   (a) an operator body having a bore therein,
   (b) an aperture in the bottom of said bore in coaxial relationship therewith,
   (c) a stem member disposed for axial and rotatable movement in said bore,
   (d) said stem member having one end portion extendable through said aperture in response to axial movement thereof for operating a valve mechanism associated with said operator device and having a threaded portion on the upper end thereof, said threaded portion having a pair of spaced parallel opposed planar portions thereon extending axially of said stem, and
   (e) laterally spaced thread engaging means fixed transversely in the upper end of said bore, said means being spaced a predetermined distance to engage said threads, said distance being greater than the distance between said planar portions.

7. The operator device recited in claim 6, further characterized in that said laterally spaced thread engaging means comprises a portion of each of the legs of a U-shaped member flatly disposed on the bottom of a counterbore of said bore for partial lateral disposition in said bore.

References Cited

UNITED STATES PATENTS

| | | |
|---|---|---|
| 1,968,957 | 8/1934 | Musgrave. |
| 3,236,494 | 2/1966 | Frantz. |
| 3,351,093 | 11/1967 | Frantz. |

FRED C. MATTERN, JR., *Primary Examiner.*

F. D. SHOEMAKER, *Assistant Examiner.*

U.S. Cl. X.R.

251—130